United States Patent
Terazawa

(10) Patent No.: US 8,508,151 B2
(45) Date of Patent: Aug. 13, 2013

(54) POWER UNIT AND LIGHTING APPARATUS

(75) Inventor: Noriaki Terazawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 178 days.

(21) Appl. No.: 13/061,044

(22) PCT Filed: Jul. 29, 2009

(86) PCT No.: PCT/JP2009/003577
§ 371 (c)(1),
(2), (4) Date: Feb. 25, 2011

(87) PCT Pub. No.: WO2010/023817
PCT Pub. Date: Mar. 4, 2010

(65) Prior Publication Data
US 2011/0148319 A1    Jun. 23, 2011

(30) Foreign Application Priority Data

Aug. 29, 2008   (JP) .................................. 2008-222211

(51) Int. Cl.
*H05B 37/02*    (2006.01)
(52) U.S. Cl.
USPC ............................. 315/291; 315/276; 315/307
(58) Field of Classification Search
USPC ................. 315/247, 272, 276, 287, 291, 297, 315/299, 307, 308; 363/16, 20, 21.01, 21.12, 363/21.15, 21.17, 49, 95, 97, 131
See application file for complete search history.

(56) References Cited

U.S. PATENT DOCUMENTS

| | | | | |
|---|---|---|---|---|
| 6,577,512 | B2 * | 6/2003 | Tripathi et al. | 363/21.17 |
| 8,023,292 | B2 * | 9/2011 | Hachiya | 363/21.18 |
| 2005/0169019 | A1 * | 8/2005 | Konno | 363/49 |
| 2007/0152604 | A1 | 7/2007 | Tatsumi | |
| 2007/0267984 | A1 * | 11/2007 | Peng | 315/312 |
| 2008/0278092 | A1 * | 11/2008 | Lys et al. | 315/247 |

FOREIGN PATENT DOCUMENTS

| | | |
|---|---|---|
| JP | 8-234852 A | 9/1986 |
| JP | 4-217877 A | 8/1992 |
| JP | 11-206116 A | 7/1999 |
| JP | 2000-295839 A | 10/2000 |
| JP | 2002-10474 A | 1/2002 |
| JP | 2005-304128 A | 10/2005 |
| JP | 2007-80771 A | 3/2007 |

* cited by examiner

*Primary Examiner* — Tung X Le
(74) *Attorney, Agent, or Firm* — Birch, Stewart, Kolasch & Birch, LLP

(57) ABSTRACT

When a voltage V detected by a voltage detecting section is lower than a first threshold value Vth1, an NPN transistor is turned on, a control terminal Ve is placed at a low level, and an overload protection circuit section halts the operation of a switching circuit section. When the voltage V detected by the voltage detecting section becomes higher than the first threshold value Vth1, the NPN transistor is turned off, the control terminal Ve is placed at a high level, and the overload protection circuit section resets the halt of the operation of the switching circuit section and makes the operation resumed.

6 Claims, 11 Drawing Sheets

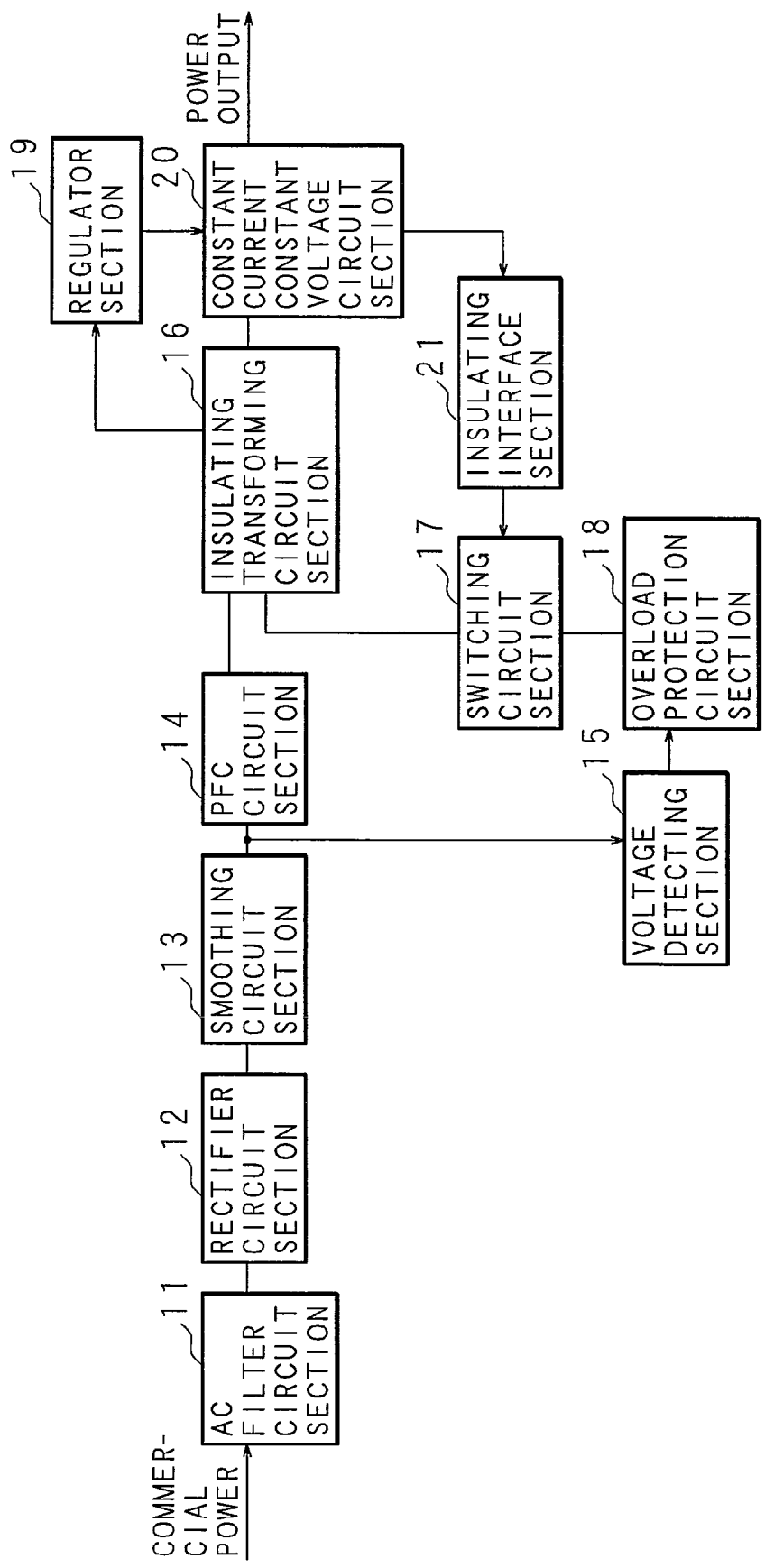
F I G. 2

POWER UNIT AND LIGHTING APPARATUS

This application is the national phase under 35 U.S.C. §371 of PCT International Application No. PCT/JP2009/003577 filed on Jul. 29, 2009, which claims priority under 35 U.S.C. 119(a) to Patent Application No. 2008-222211 filed in Japan on Aug. 29, 2008, all of which are hereby expressly incorporated by reference into the present application.

BACKGROUND

1. Technical Field

The present invention relates to a power unit capable of continuously performing a normal operation even when the voltage of a commercial power is varied and a lighting apparatus including the power unit.

2. Description of Related Art

Recently, lighting apparatuses using a light emitting diode (hereinafter referred to as an LED) as a light source have been developed for various purposes, and have being replaced lighting apparatuses using a conventional light source such as an incandescent lamp or a fluorescent lamp. Furthermore, as vehicle lighting apparatuses such as a headlight and a taillight, lighting apparatuses using an LED as a light source have already been commercially available.

In a power circuit (a power unit) used in a lighting apparatus using an LED as a light source, power control different from that employed in a lighting apparatus using a conventional light source is required because of a difference in characteristics between the conventional light source such as an incandescent lamp and the LED. For example, since an LED is required to drive with a constant current due to the electric characteristics of the device, a power circuit of a lighting apparatus using the LED as a light source should employ constant current output specifications with a voltage/current output characteristic for keeping a current constant against variation of a voltage instead of general constant voltage output specifications.

On the other hand, failure modes of an LED include two modes of an open mode and a short mode, and therefore, the power circuit should be provided with an overload protection circuit as a protection function against an overload state such as overcurrent or overvoltage derived from a failure or the like of the LED. The overload protection function is realized by, for example, detecting overcurrent of a switching element on a primary side of a switching transformer included in the power circuit so as to detect an overload state such as overvoltage or overcurrent of a load on a secondary side of the switching transformer, and thus, the power output is halted when the overload state is caused.

Moreover, an overcurrent protection device to be used in a power unit employing an inverter control method using an element other than a light source as a load has been disclosed (see Japanese Patent Application Laid-Open No. 4-217877), in which an abnormal detection signal is output from an overcurrent detection circuit when an input current to an inverter exceeds a prescribed value, and a latch circuit to be reset in accordance with the abnormal detection signal for keeping in the reset state until a reset signal is input is provided so as to continuously halt the output of the inverter.

SUMMARY

Such an overload protection function may be realized not only by employing a latch type configuration as described above but also by employing an automatic reset type configuration. In the overload protection function employing the latch type configuration, when the overload protection function is reset after the overload protection function is activated, it is necessary to once turn off the input power supply such as commercial power. On the other hand, in the overload protection function employing the automatic reset type configuration, when an overcurrent state of a switching element having been placed in an overload state is reset, the switching element resumes the switching operation and the power output is restored. Therefore, in accordance with a factor causing the overcurrent, it is apprehended in the automatic reset type configuration that the device may enter a loop of occurrence of the overload, halt of the power output, reset of the overload factor, restore of the power output, occurrence of the overload, halt of the power output, etc., so that it may be difficult to guarantee the safety of the power unit (the power circuit) or the lighting apparatus. Accordingly, the overload protection function employing the latch type configuration is utilized in more cases than that employing the automatic reset type configuration.

The power circuit in which the primary side of the switching transformer is switched by the switching element, however, has a characteristic that when the voltage of the commercial power (i.e., the input power supply) is lowered, an input current, namely, a current flowing to the switching element, is increased so as to supply prescribed power to the load, and thus, the power circuit is placed in a state similar to the overload state. Therefore, in the case where momentary power stoppage or momentary voltage drop of the commercial power occurs for some reason, the current flowing to the switching element is increased and the overload protection function is activated resulting in halting the power output although it is actually not an overload state caused by a failure of the LED or the like. The overload protection function employing the latch type configuration has a problem that the state where the power output is halted is continued even after the commercial power returns to a normal state.

Furthermore, although a constant current circuit with constant current output specifications may be operated in a constant current operation mode for outputting a constant current generally against allowable variation of an output voltage, when the output voltage is increased beyond the allowable variation, the constant current operation mode is shifted to a constant voltage operation mode in which an output voltage is kept constant against variation in the output current. In the case where the voltage supplied to the constant current circuit is lowered due to the momentary power stoppage or momentary voltage drop of the commercial power, a reference voltage generated in the constant current circuit is also lowered, and the circuit is placed in a state apparently similar to a state where the output voltage (i.e., the voltage of the load) is increased, and hence, the constant current operation mode is shifted to the constant voltage operation mode in the constant current circuit. Under this condition, even when the commercial power returns to a normal state, the constant current circuit continues its operation in the constant voltage operation mode, and hence, since the power circuit may not supply a necessary current to the LED, there arises a problem that the LED is continuously lighted with brightness lower than normal brightness.

The present invention was devised in consideration of the aforementioned circumstances, and an object of the invention is providing a power unit capable of continuously performing a normal operation even when the voltage of the commercial power is varied and a lighting apparatus including the power unit.

The power unit of this invention includes a conversion section for converting an AC into a DC; a switching element for switching the DC supplied from the conversion section to a primary side of a transformer; an overload detection section for detecting an overload state of a load provided on a secondary side of the transformer; an overload protection section for halting an operation of the switching element and keeping the halt when the overload detection section detects the overload state; a voltage detecting section for detecting a voltage output by the conversion section; and a control section for controlling the switching element to halt the operation thereof when the voltage detected by the voltage detecting section is lower than a first threshold value, and the first threshold value is larger than an output voltage value of the conversion section at which the overload detection section detects the overload state.

In the power unit of this invention, the control section resumes the operation of the switching element when the voltage detected by the voltage detecting section exceeds a second threshold value larger than the first threshold value after halting the operation of the switching element.

The power unit of this invention further includes a regulator section for generating a DC voltage by using a voltage supplied from the secondary side of the transformer; a constant current control section operated by the DC voltage generated by the regulator section for supplying a constant current to the load by comparing a reference voltage generated from the DC voltage with a voltage obtained by converting a current flowing to the load; and an output halting section for halting an operation of the constant current control section when a voltage supplied to the regulator section is lower than a third threshold value.

In the power unit of this invention, the output halting section halts the operation of the constant current control section by halting an operation of the regulator section.

In the power unit of this invention, an LED is used as the load.

The lighting apparatus of this invention includes an LED; and the aforementioned power unit of the invention.

According to the invention, the voltage output by the conversion section (that rectifies and smoothes an AC input from, for example, the commercial power and converts the AC into a DC) is detected by the voltage detecting section. In other words, the voltage detecting section detects occurrence of momentary power stoppage or momentary voltage drop of the commercial power. When the voltage detected by the voltage detecting section is lower than the first threshold value, the control section halts the operation of the switching element. In this case, the first threshold value is set to be larger than the output voltage value of the conversion section at which the overload state is detected by the overload detection section. The overload detection section detects, for example, overvoltage applied to the load or overcurrent flowing to the load as the overload state. Furthermore, the overload detection section may detect the overload state in accordance with the magnitude of the current flowing to the switching element. Therefore, the control section halts the operation of the switching element so as not to activate the overload protection section before the current flowing to the switching element is increased and the operation of the switching element is halted and the halt is kept by the overload protection section due to the momentary power stoppage or momentary voltage drop of the commercial power. When the commercial power returns to a normal state, the voltage detected by the voltage detecting section becomes higher than the first threshold value, and therefore, the control section resumes the operation of the switching element. In this manner, the normal operation may be continuously performed even when the voltage of the commercial power is varied.

According to the invention, the control section resumes the operation of the switching element when the voltage detected by the voltage detecting section exceeds the second threshold value larger than the first threshold value after halting the operation of the switching element. Specifically, since a prescribed voltage difference is provided between the first threshold value (i.e., a low voltage detection threshold value) for halting the operation of the switching element and the second threshold value (i.e., a low voltage reset threshold value) for resuming the operation of the switching element, when momentary voltage variation of the commercial power is repeated in a short period of time, it is possible to prevent the operation of the switching element from being halted/resumed repeatedly in a short period of time as well as the momentary power stoppage or momentary voltage drop of the commercial power may be accurately detected.

According to the invention, the regulator section generates the DC voltage by using the voltage supplied from the secondary side of the transformer, and the constant current control section is operated by the DC voltage generated by the regulator section for supplying a constant current to the load (such as an LED) by comparing the reference voltage generated from the DC voltage with the voltage obtained by converting the current flowing to the load. The output halting section halts an operation of the constant current control section when the voltage supplied to the regulator section is lower than the third threshold value. Thus, when the voltage supplied to the regulator section becomes lower than the third threshold value due to the momentary power stoppage or momentary voltage drop of the commercial power, it is possible to prevent the constant current control section from being shifted from a constant current operation mode to a constant voltage operation mode because the reference voltage generated within the constant current control section is also lowered and the power unit is placed in a state apparently similar to a state where the output voltage (i.e., the voltage of the load) is increased. Then, when the commercial power returns to the normal state, the voltage supplied to the regulator section becomes larger than the third threshold value, and the operation of the constant current control section once halted is resumed. In this case, the constant current control section normally starts and operates in the constant current operation mode, and therefore, a necessary current may be supplied to, for example, the LED, so that the LED may be lighted with normal brightness.

According to the invention, the output halting section halts the operation of the constant current control section by halting an operation of the regulator section. In this manner, it is possible to prevent the constant current control section from being shifted from the constant current operation mode to the constant voltage operation mode because the reference voltage generated within the constant current control section is also lowered and the power unit is placed in the state apparently similar to the state where the output voltage (i.e., the voltage of the load) is increased. Then, when the commercial power returns to the normal state, the voltage supplied to the regulator section becomes larger than the third threshold value, and the operation of the regulator section once halted is resumed so as to resume the operation of the constant current control section. In this case, the constant current control section normally starts and operates in the constant current operation mode, and therefore, a necessary current may be supplied to, for example, the LED, so that the LED may be lighted with normal brightness.

According to the invention, since the LED is used as the load, even when the voltage of the commercial power is varied, it is possible to prevent the LED from being continuously placed in an off state or continuously lighted with brightness lower than normal brightness, and hence, the LED may be normally continuously lighted.

According to the invention, since the aforementioned power unit is provided, the lighting apparatus capable of continuously performing a normal operation even when the voltage of the commercial power is varied may be provided.

According to the invention, a normal operation may be continuously performed even when momentary power stoppage or momentary voltage drop of the commercial power occurs.

The above and further objects and features of the invention will more fully be apparent from the following detailed description with accompanying drawings.

BRIEF DESCRIPTION OF THE SEVERAL VIEWS OF THE DRAWINGS

FIG. 2 is a block diagram illustrating an example of the configuration of a power section corresponding to a power unit according to the invention.

DETAILED DESCRIPTION

Embodiment 1

Figure 1:
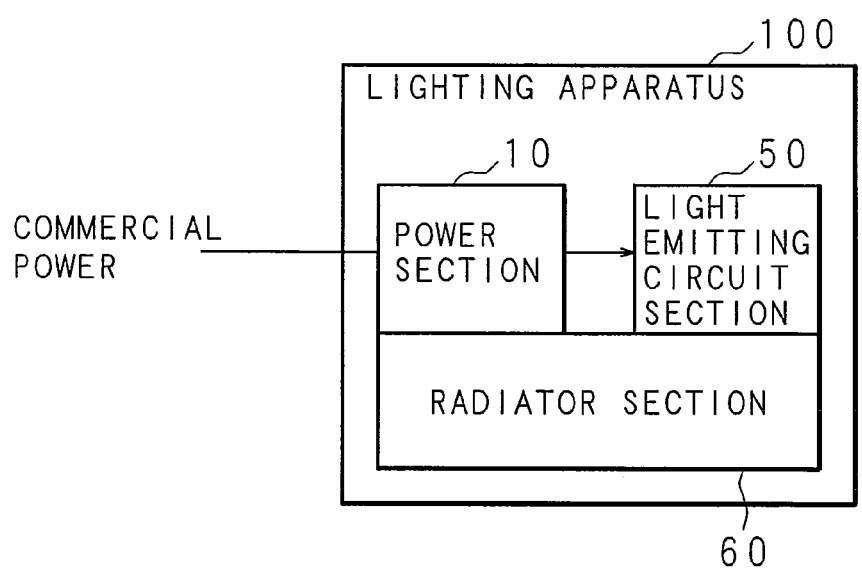
FIG. 1 is a block diagram illustrating an example of the configuration of a lighting apparatus according to the invention.

The present invention will now be described with reference to the accompanying drawings illustrating embodiments thereof. FIG. 1 is a block diagram illustrating an example of the configuration of a lighting apparatus 100 according to the invention. As illustrated in FIG. 1, the lighting apparatus 100 includes a power section 10 corresponding to a power unit of this invention, a light emitting circuit section 50, a radiator section 60 and the like. The power section 10 is externally supplied with commercial power, so as to output a constant current for driving the light emitting circuit section 50 including, for example, an LED (a light emitting diode) mounted on a circuit board. Since the power section 10 and the light emitting circuit section 50 generate heat, the power section 10 and the light emitting circuit section 50 are thermally connected to the radiator section 60 for radiating the generated heat. The radiator section 60 is thermally connected also to a housing (a case) of the lighting apparatus 100, so that heat generated within the lighting apparatus 100 can be effectively radiated to the outside.

It is noted that the lighting apparatus 100 may employ any of various structures in accordance with the application including a structure to be attached on a ceiling or a wall, a structure to be hung from a ceiling and a structure to be placed on a floor or a table.

Figure 3:
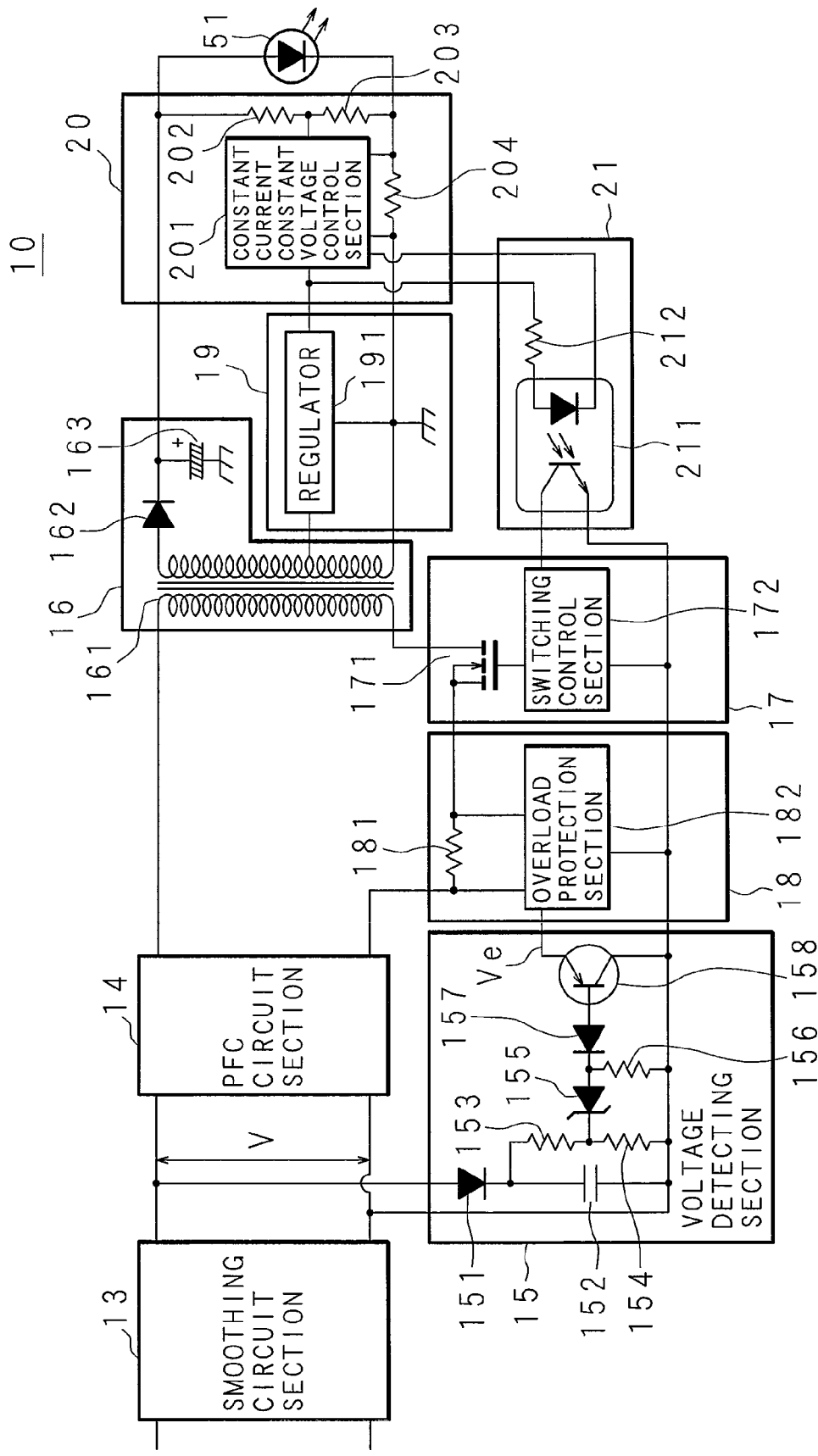
FIG. 3 is an explanatory diagram illustrating an example of the circuit configuration of a principal part of the power section corresponding to the power unit of the invention.

FIG. 2 is a block diagram illustrating an example of the configuration of the power section 10 corresponding to the power unit of this invention, and FIG. 3 is an explanatory diagram illustrating an example of the circuit configuration of a principal part of the power section 10 corresponding to the power unit of this invention. As illustrated in FIG. 2, the power section 10 has a function as a control circuit that is disposed between the commercial power and the LED corresponding to a load and is capable of controlling a current supplied from the commercial power to the LED to be constant.

The power section 10 includes an AC filter circuit section 11 for removing noise (such as noise of a high frequency component) included in an AC supplied from the commercial power; a rectifier circuit section 12 for full-wave rectifying the AC from which the noise has been removed; a smoothing circuit section 13 for smoothing pulsating flow of a DC voltage obtained through the full-wave rectification; a PFC (Power Factor Correction) circuit section 14 for increasing the power factor having been lowered by the smoothing circuit; an insulating transforming circuit section 16 for dividing the voltage having been boosted by the PFC circuit section 14 into a primary voltage and a secondary voltage for attaining a driving voltage for the LED; a constant current constant voltage circuit section 20 corresponding to a constant current control section for controlling a switching circuit section 17 described later by detecting a current flowing to the LED so as to make a constant current supplied to the LED corresponding to the load; a regulator section 19 for generating a power source for driving the constant current constant voltage circuit section 20; the switching circuit section 17 for controlling the insulating transforming circuit section 16 in accordance with feedback control performed by the constant current constant voltage circuit section 20; an insulating interface section 21 for electrically insulating the constant current constant voltage circuit section 20 and the switching circuit section 17 from each other and transferring, to the switching circuit 17, a feedback control signal (controlled in accordance with an on signal or an off signal and controlled in accordance with the magnitude of a current value in using the on signal) obtained on the basis of the current value detected by the constant current constant voltage circuit section 20; an overload protection circuit section 18 corresponding to an overload protection section for protecting the switching circuit section 17 from a damage caused by overload; a voltage detecting section 15 for detecting a smoothed voltage corresponding to an output voltage of the smoothing circuit section 13 so as to detect momentary power stoppage or momentary voltage drop of the commercial power; and the like.

The rectifier circuit section 12 and the smoothing circuit section 13 function as a conversion section for converting an AC to a DC and output a voltage of approximately 100 V when the commercial power is normal. Furthermore, the voltage detecting section 15, the overload protection circuit section 18 and a part of the switching circuit section 17 function as a control section for controlling a switching element (such as an FET) included in the switching circuit section 17 to halt its operation when the voltage detected by the voltage detecting section 15 is lower than a prescribed first threshold value.

Moreover, as illustrated in FIG. 3, the voltage detecting section 15 includes a series circuit of a diode 151 connected to an output end of the smoothing circuit section 13 and a capacitor 152; a series circuit of a resistor 153 and a resistor 154 for dividing a voltage on a junction point between the diode 151 and the capacitor 152; a series circuit of a resistor 156 and a zener diode 155 with the cathode connected to a junction point between the resistor 153 and the resistor 154; a diode 157 with the cathode connected to a junction point between the zener diode 155 and the resistor 156; an NPN transistor 158 with the base connected to the anode of the diode 157; and the like. The emitter of the NPN transistor 158 functions as a control terminal Ve for the overload protection circuit section 18.

The overload protection circuit section 18 includes a resistor 181 for converting a current flowing to an FET 171 corresponding to the switching element described later into a voltage; an overload protection section 182 for controlling the operation of the switching circuit section 17 in accordance with the magnitude of the current detected by the resistor 181; and the like.

The switching circuit section 17 includes an FET (such as an N-channel MOS FET or an enhancement type FET) 171 corresponding to the switching element; a switching control section 172 for controlling on/off of the FET 171; and the like. The switching control section 172 performs PWM control for controlling the pulse width of on/off of the FET 171 in accordance with, for example, the feedback control signal output from the constant current constant voltage circuit section 20. It is noted that the FET 171 may be replaced with a bipolar transistor.

The insulating transforming circuit section 16 includes a switching transformer 161, a diode 162 for rectifying/smoothing a voltage generated on a secondary side of the switching transformer 161, a capacitor 163 and the like. Furthermore, it supplies a voltage drawn from a part of a secondary winding of the switching transformer 161 to a regulator 191 included in the regulator section 19.

The constant current constant voltage circuit section 20 includes a series circuit of resistors 202 and 203 for dividing and detecting voltages on both ends of the LED 51; a resistor 204 for detecting a current flowing to the LED 51 and converting the current into a voltage; a constant current constant voltage control section 201 for controlling the current flowing to the LED 51 to be constant by comparing the voltage obtained by converting the current flowing to the LED 51 and a prescribed reference voltage with each other; and the like. It is noted that the reference voltage is generated by using a voltage supplied from the regulator 191.

The insulating interface section 21 includes a resistor 212 for restricting the feedback control signal to a desired voltage or current value in accordance with the current flowing to the LED 51 and the voltages on the both ends of the LED 51 detected by the constant current constant voltage control section 201; a photo coupler 211 having a light emitting diode and a photo transistor; and the like. The photo coupler 211 is provided for electrically insulating the primary side and the secondary side of the switching transformer 161 from each other.

The LED 51 includes a plurality of LED chips and is, for example, a surface mount LED of pseudo white using a blue LED and a yellow phosphor in which a plurality of LED chip groups each including a plurality of serially connected LED chips are connected in parallel. Light emitted from the LED of pseudo white is a mixture of blue light emitted from a blue LED and yellow light emitted from a yellow phosphor excited by the blue light from the blue LED, and hence it looks as if white light was emitted. It is noted that the structure of the LED 51 is not limited to the surface mount type but a lamp-shaped LED may be mounted on a substrate with a lead.

Next, the operation of the power section 10 will be described. When the input voltage is supplied from the commercial power (namely, the power is turned on), the switching circuit section 17 is operated for supplying a constant current to the LED 51 from the constant current constant voltage circuit section 20, and therefore, the LED 51 is lighted with desired brightness. Furthermore, even when the forward voltage of the LED 51 is varied due to the ambient temperature, elapsed time after lighting or the like, since the constant current constant voltage circuit section 20 is operated in a constant current operation mode, the current flowing to the LED 51 is always kept constant, and hence, lighting with stable brightness may be attained.

In the case where a failure such as an open or a short is caused in an LED chip included in the LED 51, the voltages on the both ends of the LED 51 are varied or the current flowing to the LED 51 is increased. When the LED 51 is placed in an overload state such as overvoltage or overcurrent due to the failure of the LED chip, a current flowing to the primary side of the switching transformer 161, namely, a current flowing to the FET 171, is increased. The increased current is detected by and converted into a voltage by the resistor 181 working as an overload detecting section, and the overload protection section 182 makes the switching control section 172 halt the switching operation of the FET 171 for preventing abnormal heat generation or damage of the FET 171 and the like. Therefore, the power unit 10 halts the switching operation and halts the power output. Furthermore, since the overload protection section 182 has a latch type overload protection function, the halt state of the switching operation is kept.

Figure 4:
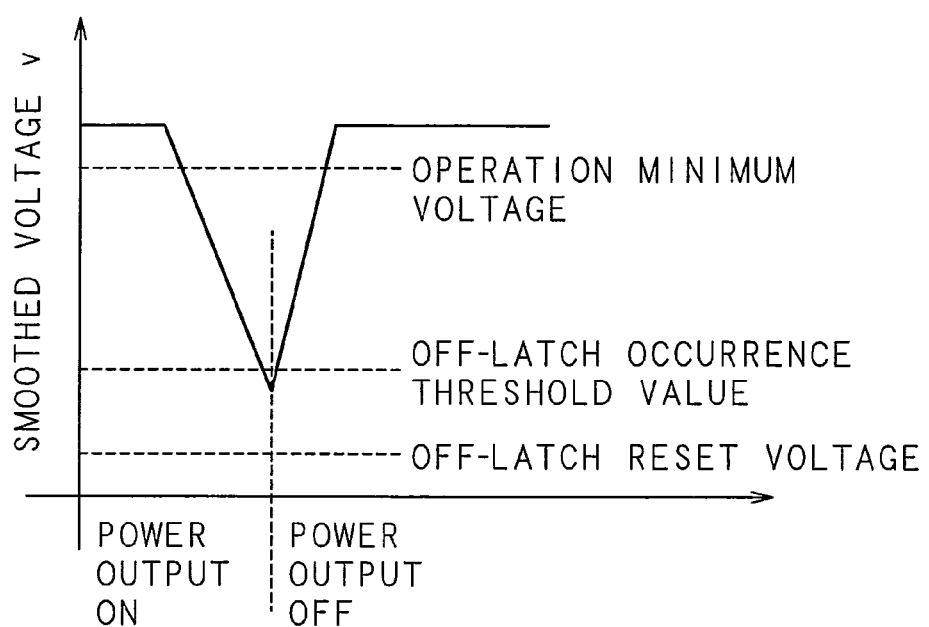
FIG. 4 is a time chart illustrating transition of a conventional power output.

Next, a case of occurrence of momentary power stoppage or momentary voltage drop of the commercial power will be described. First, for comparison with the present invention, a conventional case will be described. FIG. 4 is a time chart illustrating transition of a conventional power output. A power circuit in which the primary side of a switching transformer is switched by using an FET has a characteristic that an input current, namely, a current flowing to the FET, is increased for supplying prescribed power to a load (i.e., an LED) when momentary power stoppage or momentary voltage drop of the commercial power occurs, and hence, the power circuit is placed in a state similar to an overload state. Therefore, in the case where the momentary power stoppage or momentary voltage drop of the commercial power occurs for some reason, although it is actually not an overload state derived from a failure of the LED or the like, a current flowing to the switching element is increased so as to activate the overload protection function, resulting in halting the power output. When the overload protection function is the latch type, the halt state of the power output is continued even after the commercial power returns to the normal state.

In FIG. 4, an off-latch occurrence threshold value is a voltage value at which the apparent overload state is detected as a result of the increase of the current flowing to the FET caused when a smoothed voltage V is lowered. Furthermore, in FIG. 4, an operation minimum voltage is a voltage at which a normal operation of the power circuit is guaranteed and is, for example, 80 V. Also, an off-latch reset voltage is a voltage at which off-latch is reset and is, for example, 20 through 30 V, and a latch state may be reset by once breaking the commercial power (namely, by turning off the power).

For example, as illustrated in FIG. 4, the smoothed voltage V is lowered for a short period of time (of, for example, several tens through several hundreds msec.) when the momentary power stoppage or momentary voltage drop of the commercial power occurs. When the smoothed voltage V becomes lower than the off-latch occurrence threshold value, the overload protection function is activated so as to halt the switching operation of the FET, and hence, the power output undergoes an on to off transition. Thereafter, even when the commercial power returns to the normal state and the smoothed voltage V is returned to a normal value (of, for example, 100 V), since the off-latch state remains to be set, the power output remains to be off, and the LED is kept to be off.

Figure 5:
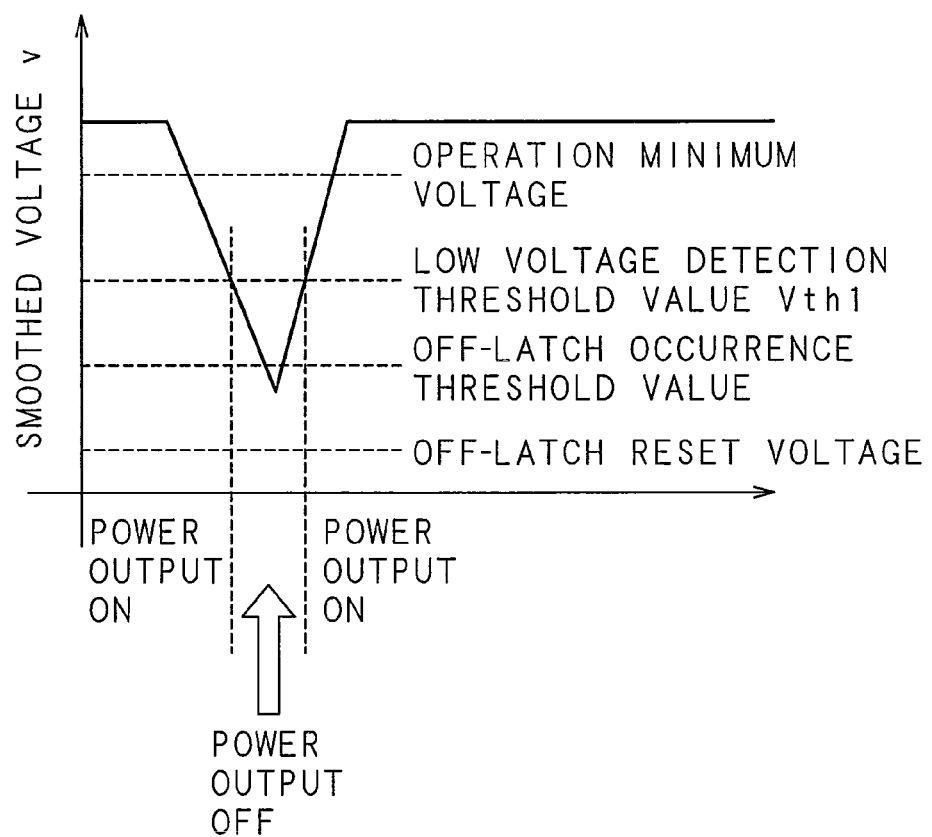
FIG. 5 is a time chart illustrating an example of transition of a power output of the power unit according to an embodiment of the invention.

Next, a case of this invention will be described. FIG. 5 is a time chart illustrating an example of transition of the power output of the power section 10 of this embodiment. In FIG. 5, a low voltage detection threshold value Vth1 is a first threshold value Vth1 (of, for example, 60 V) set by the resistors 153 and 154 and the zener diode 155 of the voltage detecting section 15 and is set to a voltage higher than the aforementioned off-latch occurrence threshold value.

The voltage detecting section 15 detects occurrence of the momentary power stoppage or momentary voltage drop of the commercial power. Then, in the case where the voltage V detected by the voltage detecting section 15 is lower than the first threshold value Vth1 (of, for example, 60 V), the NPN transistor 158 is turned on and the control terminal Ve is placed at a low level (of, for example, a ground level), and hence, the overload protection circuit section 18 halts the operation of the switching circuit section 17.

Thereafter, in the case where the voltage V detected by the voltage detecting section 15 becomes higher than the first threshold value Vth1 because the commercial power returns to the normal state, the NPN transistor 158 is turned off and the control terminal Ve is placed at a high level, and hence, the overload protection circuit section 18 resets the halt of the operation of the switching circuit section 17 and makes the operation resumed. As a result, the power output is also restored.

In this case, since the first threshold value Vth1 is set to a value larger than the off-latch occurrence threshold value, that is, the voltage at which the overload state is detected by the resistor 181 as a result of the increase of the current flowing to the FET 171 caused when the voltage V output by the smoothing circuit section 13 is lowered, the operation of the FET 171 is halted so as not to activate the overload protection section 182 before the current flowing to the FET 171 is increased and the operation of the FET 171 is halted and the halt is kept by the overload protection section 182 due to the momentary power stoppage or momentary voltage drop of the commercial power. Then, when the commercial power returns to the normal state, the voltage detected by the voltage detecting section 15 becomes higher than the first threshold value Vth1, and hence, the operation of the FET 171 is resumed. In this manner, even when the voltage of the commercial power is varied, the off-latch protection is not activated but the operation of the power unit 10 may be normally continued.

It is noted that the configuration of the voltage detecting section 15 is merely exemplarily described and is not limited to that illustrated in FIG. 3. The NPN transistor 158 may be replaced with a PNP transistor. Alternatively, it is possible to employ a structure for halting the operation of the switching circuit section 17 by the overload protection circuit section 18 when the control terminal Ve is at a high level and resuming the operation of the switching circuit section 17 by the overload protection circuit section 18 when the control terminal Ve is at a low level.

Figure 6:
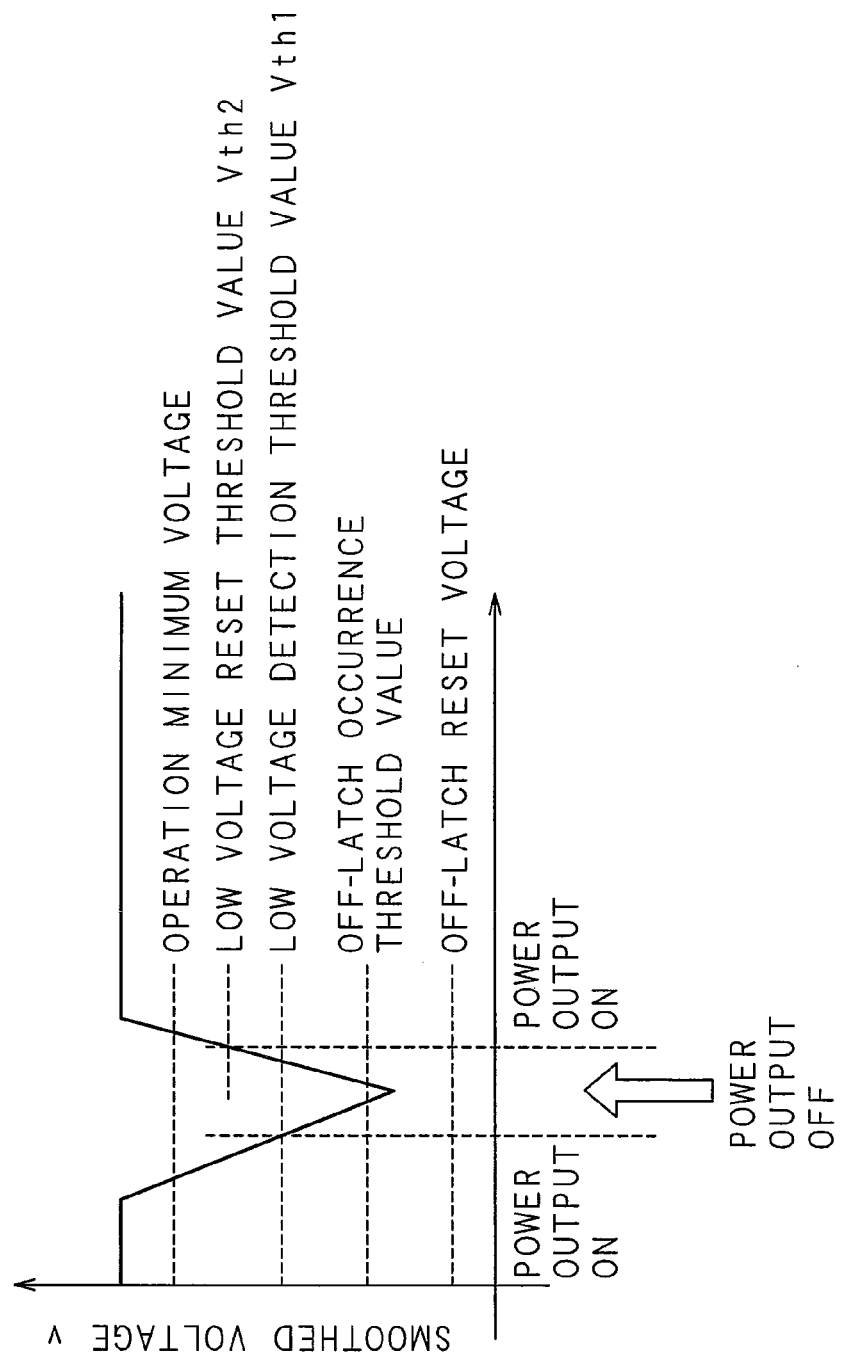
FIG. 6 is a time chart illustrating another example of the transition of the power output of the power unit according to the embodiment of the invention.

Furthermore, the configuration of the voltage detecting section 15 is not limited to that described above. FIG. 6 is a time chart illustrating another example of the transition of the power output of the power section 10 of this embodiment. In the example of FIG. 6, a low voltage reset threshold value Vth2 (of, for example, 70 V) higher than the low voltage detection threshold value Vth1 is provided in addition to the low voltage detection threshold value Vth1. Incidentally, in order to set the low voltage reset threshold value Vth2 in addition to the low voltage detection threshold value Vth1, a configuration similar to (but different in a resistance value or the like) the resistors 153 and 154, the zener diode 155 and the NPN transistor 158 is additionally provided in the voltage detecting section 15, and the output of each of these NPN transistors is combined with a logic such as NOT (an inverter), a logical sum or a logical product, and thus, the low voltage reset threshold value Vth2 may be set.

The voltage detecting section 15 detects the occurrence of the momentary power stoppage or momentary voltage drop of the commercial power. Then, in the case where the voltage V detected by the voltage detecting section 15 is lower than the first threshold value Vth1 (of, for example, 60 V), the control terminal Ve is placed at a low level (of, for example, the ground level), and thus, the overload protection circuit section 18 halts the operation of the switching circuit section 17.

Thereafter, in the case where the voltage V detected by the voltage detecting section 15 becomes higher than the second threshold value Vth2 after the commercial power returns to the normal state, the control terminal Ve corresponding to the control input end of the overload protection section 182 is placed at a high level, and thus, the overload protection circuit section 18 resets the halt of the operation of the switching circuit section 17 and makes the operation resumed. As a result, the power output is also restored. In this case, it is noted that two control terminals including a terminal for low voltage detection and a terminal for low voltage reset may be provided instead of the one control terminal Ve.

Figure 7:
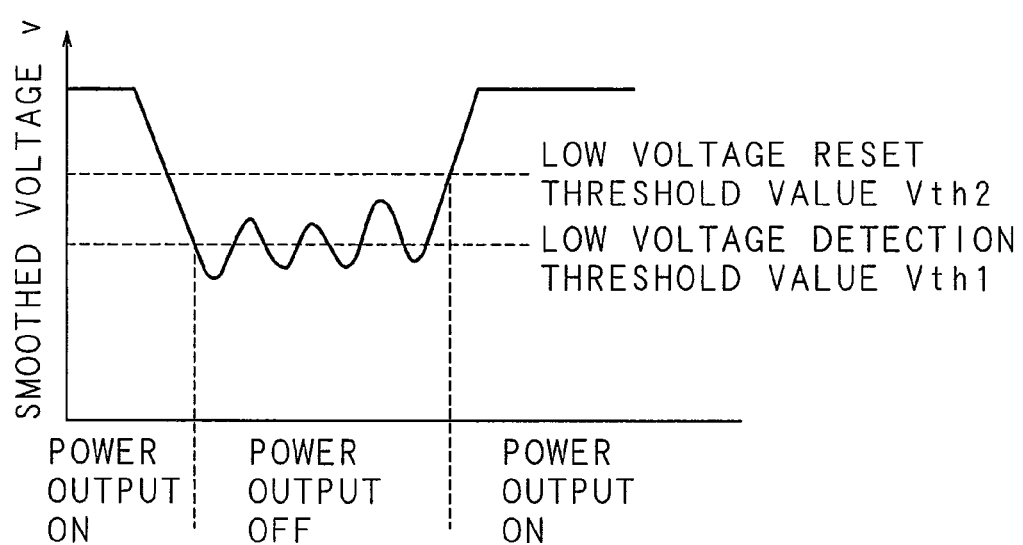
FIG. 7 is a schematic diagram illustrating variation of a smoothed voltage caused by momentary variation of commercial power.

FIG. 7 is a schematic diagram illustrating variation of the smoothed voltage caused by the momentary variation of the commercial power. As illustrated in FIG. 7, in the case where the momentary voltage variation of the commercial power is repeated in a short period of time, even if the smoothed voltage V is repeatedly slightly varied in a short period of time, when a desired voltage difference is provided between the first threshold value Vth1 (i.e., the low voltage detection threshold value) for halting the operation of the FET 171 and the second threshold value (i.e., the low voltage reset threshold value) for resuming the operation of the FET 171, it is possible to prevent the operation of the FET 171 from being halted/resumed repeatedly in a short period of time as well as the momentary power stoppage or momentary voltage drop of the commercial power may be accurately detected.

Embodiment 2

Figure 8:
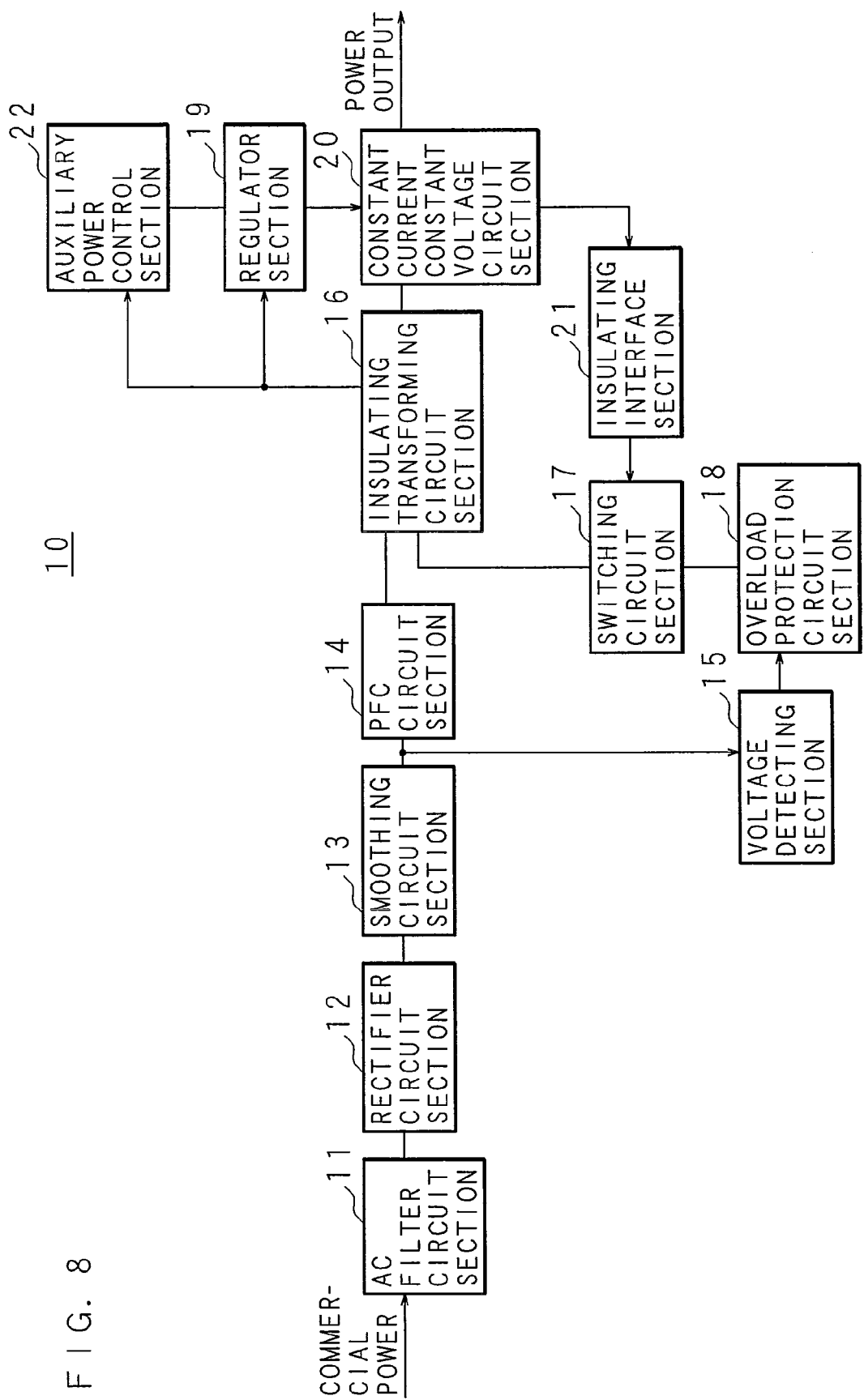
FIG. 8 is a block diagram illustrating an example of the configuration of a power section according to Embodiment 2 of the invention.
Figure 9:
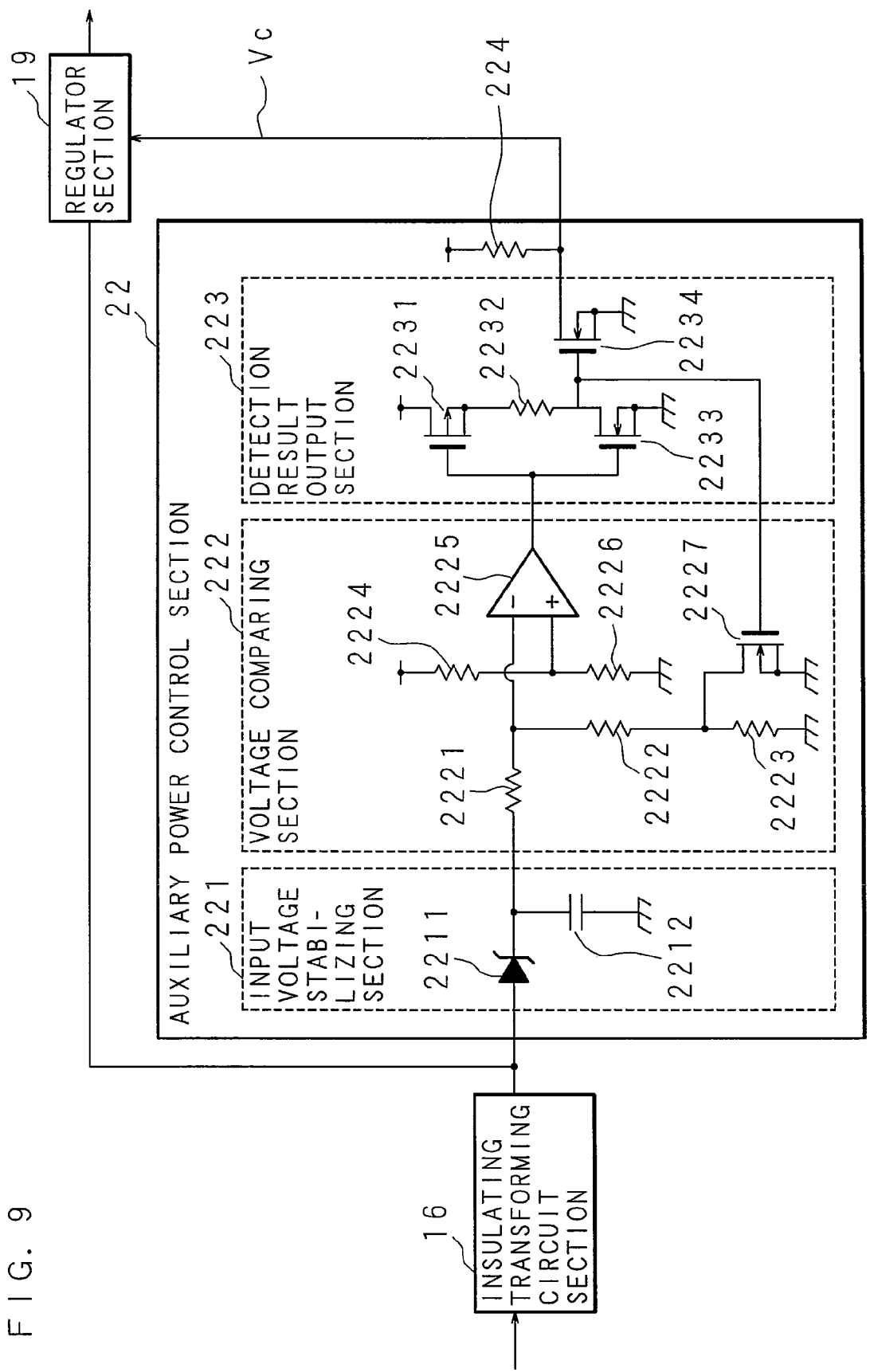
FIG. 9 is an explanatory diagram illustrating an example of the circuit configuration of a principal part of an auxiliary power control section.

FIG. 8 is a block diagram illustrating an example of the configuration of a power unit 10 according to Embodiment 2 of the invention, and FIG. 9 is an explanatory diagram illustrating an example of the circuit configuration of a principal part of an auxiliary power control section 22. Embodiment 2 has the auxiliary power control section 22, which is different from Embodiment 1. The auxiliary power control section 22 monitors a voltage supplied from an insulating transforming circuit section 16 to a regulator section 19. In the case where a voltage on the primary side of the insulating transforming circuit section 16 is lowered because of the momentary power stoppage or momentary voltage drop of the commercial power, the voltage supplied from the insulating transforming circuit section 16 is also lowered. Therefore, the voltage supplied to the regulator section 19 is lowered, and hence, the output voltage of the regulator section 19 is also lowered. When the voltage supplied to the regulator section 19 is lower than a third threshold value (for example, a voltage at which the output voltage of the regulator section 19 is so low that a constant current constant voltage circuit section 20 may not be normally operated), the auxiliary power control section 22 corresponding to an output halting section halts the operation of the regulator section 19.

Under this condition, in the case where the voltage supplied from the insulating transforming circuit section 16 to the regulator section 19 returns to a normal value because the voltage of the commercial power returns to a normal value, the output voltage of the regulator section 19 also returns to a normal value, and the constant current constant voltage circuit section 20 normally starts and operates in a constant current operation mode, and therefore, it may supply a necessary current to, for example, an LED. As a result, the LED may be lighted with normal brightness.

As illustrated in FIG. 9, the auxiliary power control section 22 includes an input voltage stabilizing section 221, a voltage comparing section 222, a detection result output section 223, a resistor 224 and the like. Furthermore, the input voltage stabilizing section 221 includes a series circuit of a zener diode 2211 and a capacitor 2212, the voltage comparing section 222 includes resistors 2221, 2222, 2223, 2224 and 2226, a comparator 2225, an FET 2227 and the like, and the detection result output section 223 includes FETs 2231, 2233 and 2234, a resistor 2232 and the like.

The voltage supplied from the insulating transforming circuit section 16 to the regulator section 19 is stabilized by the input voltage stabilizing section 221 and is output to the voltage comparing section 222. The voltage comparing section 222 divides the stabilized voltage with the resistors 2221 through 2223, compares, with the comparator 2225, a divided input voltage is compared with a reference voltage set by the resistors 2224 and 2226, and when the input voltage is not more than the reference voltage, the detection result output section 223 is driven to turn on/off the operation of the regulator section 19 through a control terminal Vc. For example, the regulator section 19 halts its operation when the control terminal Vc is placed at a low level (the ground level), and the regulator section 19 starts the operation when the control terminal Vc is placed at a high level. When the voltage supplied from the insulating transforming circuit section 16 returns to a normal value, the voltage comparing section 222 turn off the FET 2234 of the detection result output section 223 and a prescribed voltage (at a high level) is applied to the control terminal Vc through the resistor 224, and hence, the regulator section 19 starts the operation.

Figure 10:
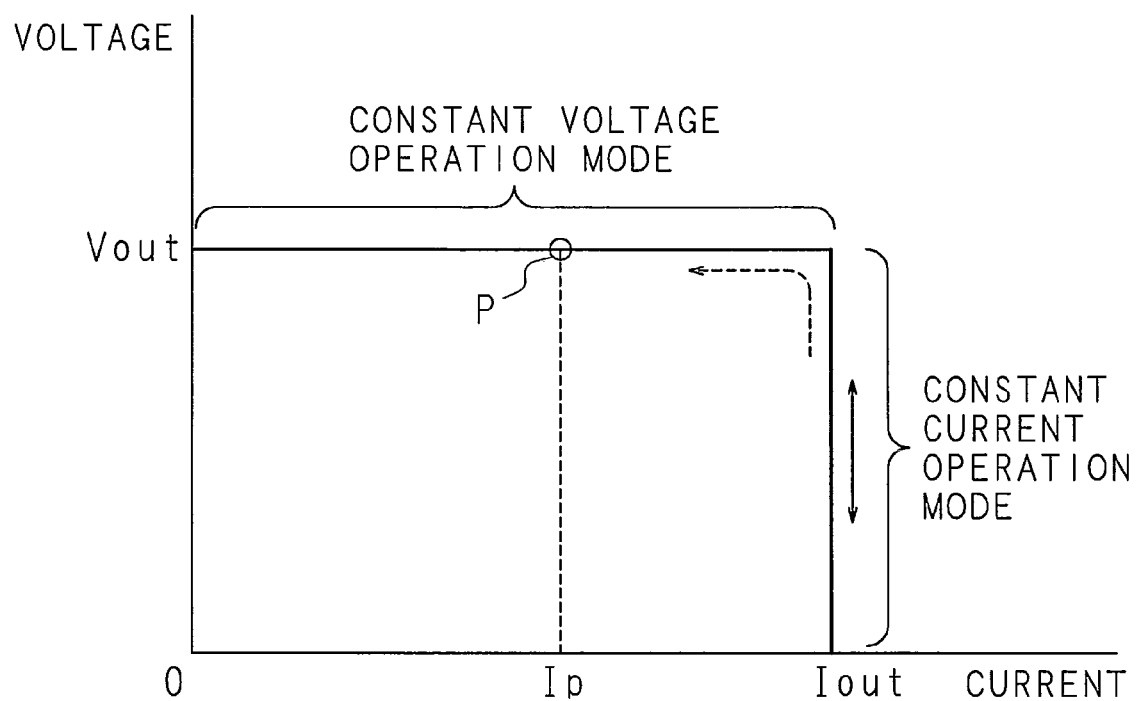
FIG. 10 is an explanatory diagram illustrating an example of an output characteristic of a constant current constant voltage circuit section.

FIG. 10 is an explanatory diagram illustrating an example of the output characteristic of the constant current constant voltage circuit section 20. In FIG. 10, the abscissa indicates the current and the ordinate indicates the voltage. As illustrated in FIG. 10, the constant current constant voltage circuit section 20 working as the constant current control section with the constant current output specifications operates in the constant current operation mode for outputting a constant current generally against allowable variation of the output voltage, but when the output voltage is increased beyond the allowable variation, it is shifted from the constant current operation mode to a constant voltage operation mode in which the output voltage is kept constant against the variation of the output current.

When the constant current constant voltage circuit section 20 starts the operation, it operates in the constant current operation mode and, for example, the current control is performed so as to keep the output current Iout constant against the voltage variation (see an arrow of a solid line illustrated in FIG. 10). When the output voltage is increased beyond the allowable variation, however, it is shifted from the constant current operation mode to the constant voltage operation mode in which the output voltage Vout is kept constant against the variation of the output current as illustrated with an arrow of a broken line in FIG. 10. In the case where the voltage supplied to the constant current constant voltage circuit section 20 is lowered due to the momentary power stoppage or momentary voltage drop of the commercial power, the reference voltage generated within the constant current constant voltage circuit section 20 is also lowered, and the power section is placed in a state apparently similar to the state where the output voltage (the voltage of the load) is increased, and therefore, the constant current constant voltage circuit section 20 unavoidably shifts the constant current operation mode to the constant voltage operation mode. Under this condition, even if the commercial power returns to the normal state, the constant current constant voltage circuit section 20 continues the operation in the constant voltage operation mode (as in a state illustrated as a point P in FIG. 10), and hence, the power section 10 may supply, to the LED, merely a current Ip smaller than the necessary current Iout, and as a result, the LED is kept on lighting with brightness lower than normal brightness.

Since the auxiliary power control section 22 is provided, when the voltage supplied to the regulator 19 is lowered below the third threshold value due to the occurrence of the momentary power stoppage or momentary voltage drop of the commercial power, the operation of the regulator 19 is halted. Therefore, the constant current constant voltage circuit section 20 may be prevented from shifting from the constant current operation mode to the constant voltage operation mode. Then, when the commercial power returns to the normal state and the voltage supplied to the regulator 19 becomes larger than the third threshold value, the operation of the constant current constant voltage circuit section 20 having been once halted is resumed, so that the constant current constant voltage circuit section 20 may normally start and operate in the constant current operation mode. Therefore, a necessary current may be supplied to, for example, the LED, and hence the LED may be lighted with normal brightness.

Figure 11:
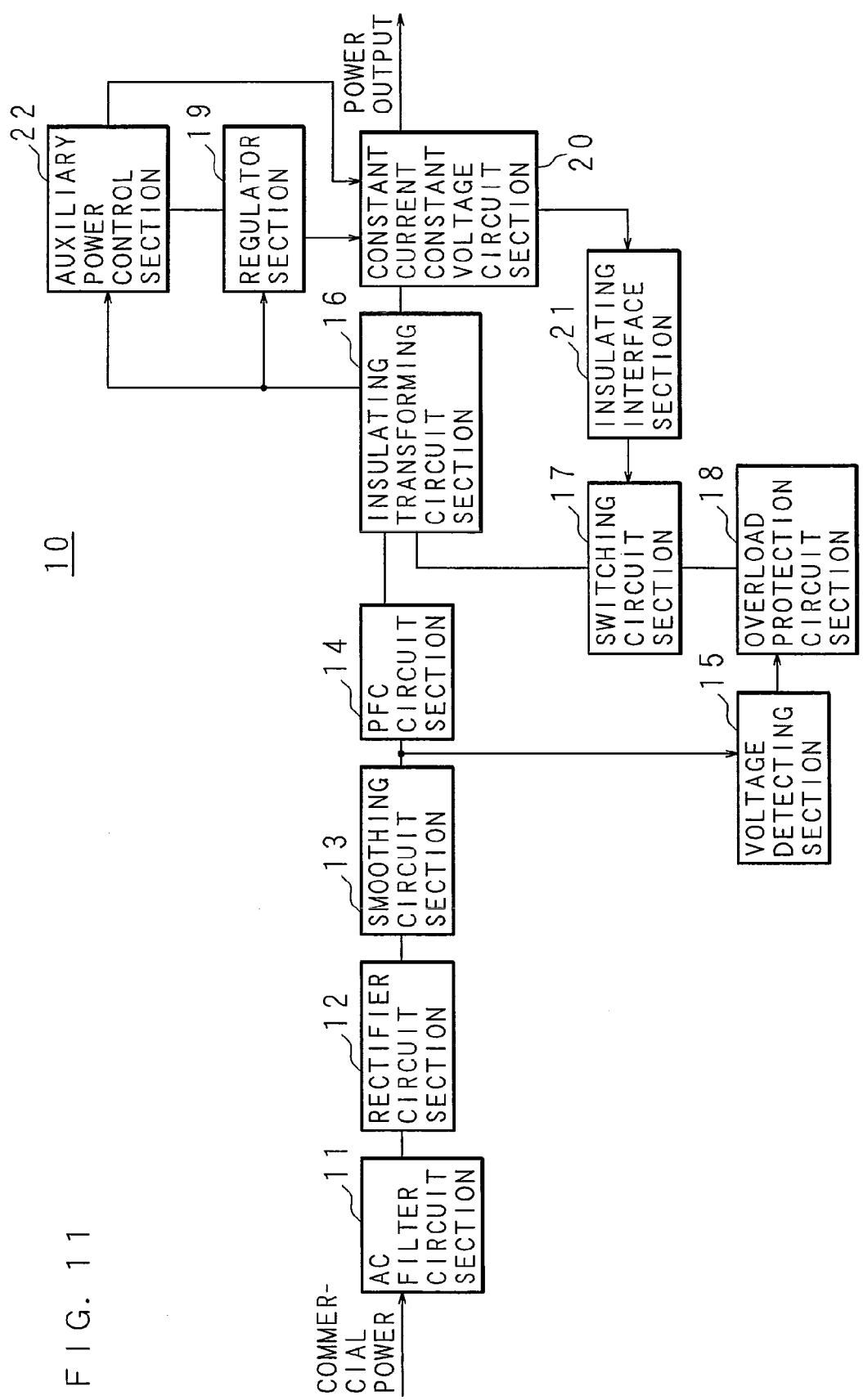
FIG. 11 is a block diagram illustrating another example of the configuration of the power section of Embodiment 2.

FIG. 11 is a block diagram illustrating another example of the configuration of the power section 10 of Embodiment 2. In the example of FIG. 11, the auxiliary power control section 22 controls the halt/start of the operation of the constant current constant voltage circuit section 20 directly instead of controlling the regulator section 19. Specifically, when the voltage supplied to the regulator section 19 from the insulating transforming circuit section 16 is detected to be lowered by the auxiliary power control section 22, it directly halts the operation of the constant current constant voltage circuit section 20, and the constant current constant voltage circuit section 20 is operated merely when the voltage supplied from the insulating transforming circuit section 16 to the regulator section 19 is not less than a prescribed voltage. Also in this manner, the LED may be stably lighted.

As described so far, according to the present invention, even when the momentary power stoppage or momentary voltage drop of the commercial power occurs, it is possible to prevent the latch type overload protection circuit section from being operated to keep the halt of the power output, and the operation of the overload protection circuit section may be normally continuously performed. Furthermore, even when the momentary voltage variation of the commercial power is repeated in a short period of time, the operation of the switching element may be prevented from being repeatedly halted/resumed in a short period of time as well as the momentary power stoppage or momentary voltage drop of the commercial power may be accurately detected. Moreover, even if the momentary power stoppage or momentary voltage drop of the commercial power occurs, a necessary current may be supplied to the LED, and hence the LED may be lighted with normal brightness. Furthermore, a lighting apparatus capable of continuously performing a normal operation even when the voltage of the commercial power is varied may be provided.

Although the LED is used as a light source in each of the aforementioned embodiments, the invention is applicable to any light source apart from the LED as far as the light source may be driven with a DC.

Although the voltage output by the smoothing circuit section from a DC having been converted from an AC obtained from the commercial power is 100 V in a normal state in each of the embodiments, the voltage is not limited to this but may be 200 V or another voltage. In this case, the off-latch reset voltage, the low voltage detection threshold value, the low voltage reset threshold value and the like may be appropriately set in accordance with the smoothed voltage obtained in the normal state.

Although the power unit of this invention is used in the lighting apparatus in each of the embodiments, the power unit of this invention is applicable to any electric equipment other than the lighting apparatus as far as it has the latch type overload protection function. In this case, even when the momentary power stoppage or momentary voltage drop of the commercial power occurs, the operation of the electric equipment may be normally continued.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A power unit comprising:
   a conversion device for converting an AC into a DC,
   a switching element for switching the DC supplied from the conversion device to a primary side of a transformer,
   an overload detection device for detecting an overload state of a load provided on a secondary side of the transformer, and
   an overload protection device for halting an operation of the switching element and keeping the halt when the overload detection device detects the overload state, comprising:
   a voltage detecting device for detecting a voltage output by the conversion device; and
   a control device for controlling the switching element to halt the operation thereof when the voltage detected by the voltage detecting device is lower than a first threshold value,
   the first threshold value being larger than an output voltage value of the conversion device at which the overload detection device detects the overload state.

2. The power unit according to claim 1, wherein the control device resumes the operation of the switching element when the voltage detected by the voltage detecting device exceeds a second threshold value larger than the first threshold value after halting the operation of the switching element.

3. The power unit according to claim 1, further comprising:
   a regulator device for generating a DC voltage by using a voltage supplied from the secondary side of the transformer;
   a constant current control device operated by the DC voltage generated by the regulator device for supplying a constant current to the load by comparing a reference voltage generated from the DC voltage with a voltage obtained by converting a current flowing to the load; and
   an output halting device for halting an operation of the constant current control device when a voltage supplied to the regulator device is lower than a third threshold value.

4. The power unit according to claim 3, wherein the output halting device halts the operation of the constant current control device by halting an operation of the regulator device.

5. The power unit according to claim 1, wherein an LED is used as the load.

6. A lighting apparatus comprising:
   an LED; and
   the power unit of claim 1.

* * * * *